UNITED STATES PATENT OFFICE.

FRANK P. JACKSON, OF YOUNGSTOWN, OHIO.

PROCESS OF TREATING NATURAL STONE.

1,396,118.     Specification of Letters Patent.    Patented Nov. 8, 1921.

No Drawing.     Application filed July 29, 1920. Serial No. 399,956.

*To all whom it may concern:*

Be it known that I, FRANK P. JACKSON, a citizen of the United States, residing at Youngstown, in the county of Mahoning and State of Ohio, have invented a certain new and useful Improvement in Processes of Treating Natural Stone, of which the following is a specification.

This invention relates to a process of treating natural stone for the purpose of rendering it suitable as a dielectric in the construction of switch boards, panel boards, switch bases and the like and also for rendering it suitable in the construction of buildings as in floors, stair treads and risers, wainscoting, partitions and the like. To these ends I prefer to use stone of fine grain, such as the fine grained blue sand stone found in the quarries of Ohio and elsewhere which in carrying out my object I treat as hereinafter particularly set forth.

I take slabs of the stone, say an inch in thickness and subject them to a temperature of from about 150° to 250° Fahrenheit in a kiln or box until thoroughly dry. I then prepare a mixture of ordinary raw linseed oil sixty per cent. and paraffin oil of commerce forty per cent. by volume which is heated to about 150° Fahrenheit and in this mixture I place the stone leaving it there for about eighteen hours maintaining the said temperature during the time. The time required for other thicknesses will vary accordingly. I then remove the stone and subject it to a drying temperature with a heat of from 100° to 150° Fahrenheit for about four hours until dried. In the treatment both the paraffin and linseed oil impregnate and saturate the stone and fill its pores and interstices thereby rendering it very hard and impervious to water.

The proportions of the oils can be varied. For example the mixture is effective where the ingredients are in equal portions by volume, but I regard the proportions first specifically stated as best for electrical uses and when coloring is not desired.

I have also discovered that by the addition of a small quantity of paraffin wax to the mixture when originally prepared, say three per cent. of the entire quantity a glossy surface is imparted to the stone.

The stone may be colored by the addition to the original mixture of a suitable coloring matter. In such case the coloring matter is best such as is soluble in the oil. The employment of paraffin oil is also of advantage because coloring matters are more soluble in it. Coloring matter is added to the mixture of linseed and paraffin oils in a quantity sufficient say about a fifth of one per cent. of the mixture ordinarily or according to the strength of color desired. Some anilin and some vegetable dyes are thus soluble. For example the red and green of the anilin, and alkanet root and probably annatto of the vegetable.

The stone thus treated constitutes an admirable substitute for slate and the several varieties of marble but it is more durable and more economical to produce than either slate or marble.

What I claim is:

1. The process of treating natural stone which consists first in expelling the moisture therefrom by means of heat and then impregnating the whole body of the stone with a mixture of linseed oil, paraffin wax and paraffin oil in a heated state.

2. The process of treating natural stone which consists first in expelling the moisture therefrom by means of heat and then impregnating the whole body of the stone with a mixture of linseed oil, paraffin wax, paraffin oil and a suitable coloring matter in the heated state.

FRANK P. JACKSON.